US009549154B1

(12) United States Patent
Jehanno et al.

(10) Patent No.: US 9,549,154 B1
(45) Date of Patent: Jan. 17, 2017

(54) MULTIPOINT COMMUNICATION SYSTEM AND METHOD

(71) Applicant: ALE INTERNATIONAL, Colombes (FR)

(72) Inventors: Loïc Jehanno, Brest (FR); Ronan Arzel, Brest (FR); Pierre Chaptal, Brest (FR)

(73) Assignee: ALE INTERNATIONAL, Colombes (FR)

( * ) Notice: Subject to any disclaimer, the term of this patent is extended or adjusted under 35 U.S.C. 154(b) by 0 days.

(21) Appl. No.: 15/234,308

(22) Filed: Aug. 11, 2016

Related U.S. Application Data

(63) Continuation of application No. PCT/IB2015/055586, filed on Jul. 23, 2015.

(30) Foreign Application Priority Data

Jul. 9, 2015 (EP) ..................................... 15306136

(51) Int. Cl.
| | |
|---|---|
| *H04N 7/14* | (2006.01) |
| *H04N 7/15* | (2006.01) |
| *H04N 5/265* | (2006.01) |
| *H04M 3/56* | (2006.01) |

(52) U.S. Cl.
CPC ............. *H04N 7/152* (2013.01); *H04M 3/567* (2013.01); *H04M 3/568* (2013.01); *H04N 5/265* (2013.01)

(58) Field of Classification Search
CPC combination set(s) only.
See application file for complete search history.

(56) References Cited

U.S. PATENT DOCUMENTS

| | | | |
|---|---|---|---|
| 5,844,600 | A | 12/1998 | Kerr |
| 2011/0205125 | A1 | 8/2011 | Lin et al. |
| 2012/0236110 | A1 | 9/2012 | Ogle et al. |
| 2013/0176910 | A1 | 7/2013 | Gorti et al. |
| 2015/0012270 | A1 | 1/2015 | Reynolds |
| 2015/0189092 | A1 | 7/2015 | Thapa et al. |

OTHER PUBLICATIONS

International Search Report with regard to PCT/IB15/55586 dated Oct. 12, 2015.

*Primary Examiner* — Joseph J Nguyen
(74) *Attorney, Agent, or Firm* — BCF LLP

(57) ABSTRACT

A multipoint communication server for establishing multipoint communication between a plurality of endpoints, the multipoint communication server comprising: a data repository containing the set of endpoints identifiers wherein each endpoint identifier corresponds to a participating endpoint, a media processing unit configured to receive an upstream media stream from an emitting endpoint, the media processing unit being further configured to generate a plurality of downstream media streams for the participating endpoints, wherein the data repository further contains a replication inhibition set which consists of a subset of the set of endpoint identifiers and comprises at least the endpoint identifier of the emitting endpoint, wherein the media processing unit is configured to generate the downstream media stream for each participating endpoint whose endpoint identifier belongs to the replication inhibition set so that the downstream media stream does not replicate the upstream media stream.

13 Claims, 4 Drawing Sheets

US 9,549,154 B1

MULTIPOINT COMMUNICATION SYSTEM AND METHOD

CROSS-REFERENCE TO RELATED APPLICATION

This United States Patent Application is a continuation of International Patent Application PCT/IB2015/055586 filed on Jul. 23, 2015 which claims priority from European Patent Application Serial No. 15306136.1 filed on Jul. 9, 2015, the entire content of which are incorporated herein by reference.

FIELD OF THE INVENTION

The invention relates to multipoint communication systems and methods, in particular for communicating video and/or audio streams between a plurality of communication endpoints.

BACKGROUND

Along with the increase of bandwidth capabilities in communication systems, audio and/or video communication systems have become increasingly popular in both business and residential applications. Indeed, in the case of geographically distributed team collaboration, these systems avoid the travelling of the team collaborators and increase flexibility.

Audio or videoconferencing technologies use video and/or audio communication to allow a plurality of people to communicate at a same time, for instance for meeting activities. Furthermore, besides the audio and/or visual transmission of meeting activities, videoconferencing technologies can be used to share documents and display information.

Each user participating to an audio and/or videoconference is recorded and/or filmed by a microphone and/or a camera at an endpoint. The microphone and/or camera generates an audio stream of the voice of the user and/or a video stream representing the user in his/her own environment.

SUMMARY

An aspect of the invention is to provide audio conferencing systems and methods for echo cancellation between multiple participants located at earshot distance from one another.

In an embodiment, the invention provides a multipoint communication server for establishing multipoint communication between a plurality of endpoints, the multipoint communication server comprising:
a session control interface configured to receive a set of endpoint identifiers, wherein each endpoint identifier identifies a participating endpoint which participates to a multipoint communication session,
a data repository containing the set of endpoints identifiers,
a media processing unit configured to receive an upstream media stream from an emitting endpoint among the participating endpoints of the multipoint communication session, the media processing unit being further configured to generate a plurality of downstream media streams for the participating endpoints of the multipoint communication session,
wherein the data repository further contains a replication inhibition set associated to the emitting endpoint, wherein the replication inhibition set consists of a subset of the set of endpoint identifiers of the participating endpoints, wherein the replication inhibition set comprises at least the endpoint identifier of the emitting endpoint,
wherein the media processing unit is configured to generate the downstream media stream for each participating endpoint whose endpoint identifier belongs to the replication inhibition set so that the downstream media stream does not replicate the upstream media stream,
wherein the media processing unit is configured to generate the downstream media stream for each participating endpoint whose endpoint identifier does not belong to the replication inhibition set, so that the downstream media stream does replicate the upstream media stream.

Thanks to these features, the multipoint communication server inhibits replicating a media stream coming from a participant to one or more other participants, as defined in the replication inhibition set. This may be done for various purpose, e.g. to avoid noise, redundancy or distraction effects on the other participants.

According to embodiments, such a multipoint communication server may comprise one or more of the features below.

In an embodiment, the multipoint communication server may comprise a session control unit for controlling the multipoint communication session.

In an embodiment, the media processing unit is further configured to:
receive a second upstream media stream from a second emitting endpoint among the participating endpoints of the multipoint communication session, wherein the data repository further contains a second replication inhibition set associated to the second emitting endpoint, wherein the second replication inhibition set consists of a subset of the set of endpoint identifiers of the participating endpoints, wherein the second replication inhibition set comprises at least the endpoint identifier of the second emitting endpoint,
in response to determining that a third participating endpoint is a participating endpoint whose endpoint identifier belongs neither to the first replication inhibition set nor to the second replication inhibition set, mixing together the first and second upstream media streams incoming from the first and second emitting endpoints in order to generate the downstream media stream for the third participating endpoint, and,
in response to determining that the third participating endpoint is a participating endpoint whose endpoint identifier belongs to the first replication inhibition set and not to the second replication inhibition set, generate the downstream media stream for the third participating endpoint to replicate the second upstream media stream without replicating the first upstream media stream, and
in response to determining that the third participating endpoint is a participating endpoint whose endpoint identifier belongs to the second replication inhibition set and not to the first replication inhibition set, generate the downstream media stream for the third participating endpoint to replicate the first upstream media stream without replicating the second upstream media stream.

Optionally, the media processing unit is further configured to:
in response to determining that the third participating endpoint is a participating endpoint whose endpoint identifier belongs both to the first replication inhibition set and to the second replication inhibition set, generate the downstream media stream for the third participating endpoint so that the downstream media stream replicates neither the first upstream media stream nor the second upstream media stream.

Alternatively, this last test may be useless, for example in the case wherein no participating endpoint is allowed to belong to two different replication inhibition sets.

The downstream media stream may be generated in a number of different manners for the third participating endpoint. When the media processing unit receives a plurality of upstream media streams from the participating endpoints of the multipoint communication session, in an embodiment, the downstream media stream for the third participating endpoint is generated by mixing each received upstream media stream excepting the upstream media streams incoming from participating endpoints whose endpoint identifiers belong to a same replication inhibition set as the third participating endpoint. In another embodiment, the downstream media stream for the third participating endpoint is generated by mixing each received upstream media streams, then by removing from the downstream media stream the upstream media streams incoming from participating endpoints whose endpoint identifiers belong to a same replication inhibition set as the third participating endpoint.

In an embodiment, the media processing unit is further configured to:
  receive a plurality of upstream media streams from the participating endpoints of the multipoint communication session,
  select among the plurality of received upstream media streams each received upstream media stream incoming from a participating endpoint whose endpoint identifier belongs to the replication inhibition set in order to generate a selection of upstream media streams,
  generate an intermediate mix by mixing the selection of upstream media streams,
  generate a global mix by mixing the intermediate mix with all other received upstream media streams among the plurality of received upstream media streams,
  in response to determining that a third participating endpoint is a participating endpoint whose endpoint identifier does not belong to the replication inhibition set, removing from the global mix at least the upstream media stream incoming from the third participating endpoint to generate a downstream media stream for the third participating endpoint,
  in response to determining that the third participating endpoint is a participating endpoint whose endpoint identifier belongs to the replication inhibition set, removing from the global mix the intermediate mix to generate a downstream media stream for the third participating endpoint.

Thanks to these features, the multipoint communication server is efficient and low-calculation costs.

In an embodiment, the media processing unit is further configured to:
  receive a plurality of upstream media streams from the participating endpoints of the multipoint communication session,
  select among the plurality of received upstream media streams each received upstream media stream incoming from a participating endpoint whose endpoint identifier belongs to the replication inhibition set, which is a first replication inhibition set, in order to generate a first selection of upstream media streams,
  select among the plurality of received upstream media streams each received upstream media stream incoming from a participating endpoint whose endpoint identifier belongs to the second replication inhibition set in order to generate a second selection of upstream media streams,
  generate a first intermediate mix by mixing the first selection of upstream media streams,
  generate a second intermediate mix by mixing the second selection of upstream media streams,
  generate a global mix by mixing the first intermediate mix and the second intermediate mix with all other received upstream media streams among the plurality of received upstream media streams,
  in response to determining that a third participating endpoint is a participating endpoint whose endpoint identifier does not belong to the first replication inhibition set, and that the third participating endpoint is a participating endpoint whose endpoint identifier does not belong to the second replication inhibition set, removing from the global mix at least the upstream media stream incoming from the third participating endpoint to generate a downstream media stream for the third participating endpoint,
  in response to determining that the third participating endpoint is a participating endpoint whose endpoint identifier belongs to the first replication inhibition set and not to the second replication inhibition set, removing from the global mix the first intermediate mix to generate a downstream media stream for the third participating endpoint,
  in response to determining that the third participating endpoint is a participating endpoint whose endpoint identifier belongs to the second replication inhibition set and not to the first replication inhibition set, removing from the global mix the second intermediate mix to generate a downstream media stream for the third participating endpoint.

In an embodiment, the media processing unit is further configured to:
  in response to determining that the third participating endpoint is a participating endpoint whose endpoint identifier belongs to both the first replication inhibition set and the second replication inhibition, removing from the global mix both the first intermediate mix and the second intermediate mix to generate a downstream media stream for the third participating endpoint.

In an embodiment, the third participating endpoint is associated to a replication inhibition set in the data repository.

In an embodiment, the media processing unit is configured to further select received upstream media streams incoming from each participating endpoint whose power level is below a threshold to generate a second selection of upstream media streams, and
to further generate the intermediate and global mixes by excluding the second selection of upstream media streams.

In an embodiment, the media processing unit is further configured to:
  receive a plurality of upstream media streams encoded in Real-Time-Protocol packets from the plurality of participating endpoints,
  convert each received upstream media stream in order to generate a respective numerical packet in a same linear format,
  temporarily store the respective numerical packets in association with the endpoint identifier of the respective participating endpoint from which the received upstream media stream originates, linearly sum the numerical packets associated with endpoint identifiers belonging to the replication inhibition set in order to generate the intermediate mix, temporarily store the intermediate mix, linearly sum the other numerical packets with the intermediate mix in order to generate the global mix.

In an embodiment, the media processing unit is further configured to:

temporarily store the global mix, in response to determining that a third participating endpoint is a participating endpoint whose endpoint identifier does not belong to the replication inhibition set, subtract from the global mix the numerical packet associated to the endpoint identifier of the third participating endpoint in order to generate the downstream media stream for the third participating endpoint, in response to determining that a third participating endpoint is a participating endpoint whose endpoint identifier belongs to the replication inhibition set, subtract from the global mix the intermediate mix in order to generate the downstream media stream for the third participating endpoint, send the generated downstream media stream to the third participating endpoint.

In an embodiment, a replication inhibition set is associated to each communication endpoint whose endpoint identifier belongs to the replication inhibition set.

In an embodiment, the media stream is selected in the set consisting of: video stream, audio stream, data or file sharing streams.

The replication inhibition sets may be generated as a function of diverse criteria, depending on specific applications. For example, the replication inhibition set may be generated as a function of locations of the participants, so as to take into account direct interactions between the participants that take place in the physical world outside the multipoint communication system. The replication inhibition sets may also be generated as a function of language preferences of the participants, e.g. in a multilingual telephone conference.

In an embodiment, the communication endpoints may directly inform the multipoint communication system from their locations based on Dual-tone multi-frequency signaling (DTMF).

In an embodiment, the invention also provides a localization system for establishing a replication inhibition set among a set of communication endpoints, the localization system comprising a receiver and a data repository, the receiver being configured to:

receive a first presence message from a first communication endpoint, wherein the first presence message comprises a first endpoint identifier which identifies the first communication endpoint, receive a second presence message from a second communication endpoint, wherein the second presence message comprises a second endpoint identifier which identifies the second communication endpoint, the localization system being configured to:

store the first endpoint identifier and the second endpoint identifier into a replication inhibition set into the data repository in response to determining that the first communication endpoint and the second communication endpoint are located in a mutual vision area or a mutual hearing area.

According to embodiments, such a localization system may comprise one or more of the features below.

In an embodiment, the first presence message further comprises a first position and the second presence message further comprises a second position, wherein the localization system is further configured to determine that distance between the first and the second positions is lower than a threshold for determining that the first communication endpoint and the second communication endpoint are located in a mutual vision area or a mutual hearing area.

In an embodiment, the localization system is further configured to determine a beacon identifier associated to the first conferencing endpoint as a function of the first message, a beacon identifier associated to the second conferencing endpoint as a function of the second message, and determine that beacon identifiers associated to the first and second conferencing endpoints are identical for determining that the first communication endpoint and the second communication endpoint are located in a mutual vision area or a mutual hearing area.

In an embodiment, the first presence message further comprises a first beacon identifier and the second presence message further comprises a second beacon identifier, wherein the localization system is further configured to determine that the first and second beacon identifiers are identical for determining that the first communication endpoint and the second communication endpoint are located in a mutual vision area or a mutual hearing area.

In an embodiment, the localization system according further comprises a transmitter configured to send the replication inhibition set to a multipoint communication server.

In an embodiment, the localization system is further configured to broadcast a request for presence report intended to cause the communication endpoint to send a presence message to the localization system. In an embodiment, the request is sent periodically in order to allow a heartbeat mechanism.

In an embodiment, the receiver is selected in the set consisting of: a WiFi access point, a Bluetooth access point, a radio access point or any combination thereof.

In an embodiment, an endpoint identifier is selected in the set consisting of: a media access control MAC address; a local identifier ID; a network access ID; a cell ID; or any combination thereof.

In an embodiment, the invention also provides a conferencing system comprising the multipoint communication server and the localization system hereinabove described.

In an embodiment, the conferencing system further comprises the participating endpoints, wherein the participating endpoints are configured to:

transmit upstream media streams to the multipoint communication server and receive downstream media streams from the multipoint communication server. In an embodiment, at least one participating endpoints is further configured to send a presence message to the localization system in response to receiving the broadcasted request from the localization system.

In an embodiment, the invention also provides a method for establishing multipoint communication between a plurality of endpoints, the method comprising:

accessing a set of endpoint identifiers, wherein each endpoint identifier identifies a participating endpoint which participates to a multipoint communication session, receiving an upstream media stream from an emitting endpoint among the participating endpoints of the multipoint communication session, generating a plurality of downstream media streams for the participating endpoints of the multipoint communication session, wherein a replication inhibition set associated to the emitting endpoint consists of a subset of the set of endpoint identifiers of the participating endpoints, wherein the replication inhibition set comprises at least the endpoint identifier of the emitting endpoint, generating the downstream media stream for each participating endpoint whose endpoint identifier belongs to the replication inhibition set so that the downstream media stream does not replicate the upstream media stream, generating the downstream media stream for each participating endpoint whose endpoint identifier does not belong to the replication inhibition set, so that the downstream media stream does replicate the upstream media stream.

According to embodiments, such a method may comprise one or more of the features below.

In an embodiment, the method further comprises:

controlling a multipoint communication session between a plurality of participating endpoints identified by a set of endpoint identifiers, wherein each endpoint identifier corresponds to a participating endpoint, In an embodiment, the method further comprises:

receiving a second upstream media stream from a second emitting endpoint among the participating endpoints of the multipoint communication session, wherein the data repository further contains a second replication inhibition set associated to the second emitting endpoint, wherein the second replication inhibition set consists of a subset of the set of endpoint identifiers of the participating endpoints, wherein the second replication inhibition set comprises at least the endpoint identifier of the second emitting endpoint, in response to determining that a third participating endpoint is a participating endpoint whose endpoint identifier belongs neither to the first replication inhibition set nor to the second replication inhibition set, mixing together the first and second upstream media streams incoming from the first and second emitting endpoints in order to generate the downstream media stream for the third participating endpoint, and, in response to determining that the third participating endpoint is a participating endpoint whose endpoint identifier belongs to the first replication inhibition set and not to the second replication inhibition set, generating the downstream media stream for the third participating endpoint to replicate the second upstream media stream without replicating the first upstream media stream, and in response to determining that the third participating endpoint is a participating endpoint whose endpoint identifier belongs to the second replication inhibition set and not to the first replication inhibition set, generating the downstream media stream for the third participating endpoint to replicate the first upstream media stream without replicating the second upstream media stream.

In an embodiment, the method further comprises:

in response to determining that the third participating endpoint is a participating endpoint whose endpoint identifier belongs both to the first replication inhibition set and to the second replication inhibition set, generating the downstream media stream for the third participating endpoint so that the downstream media stream replicates neither the first upstream media stream nor the second upstream media stream.

In an embodiment, the method further comprises:

receiving a plurality of upstream media streams from the participating endpoints of the multipoint communication session, selecting among the plurality of received upstream media streams each received upstream media stream incoming from a participating endpoint whose endpoint identifier belongs to the replication inhibition set in order to generate a selection of upstream media streams, generating an intermediate mix by mixing the selection of upstream media streams, generating a global mix by mixing the intermediate mix with all other received upstream media streams among the plurality of received upstream media streams, in response to determining that a third participating endpoint is a participating endpoint whose endpoint identifier does not belong to the replication inhibition set, removing from the global mix at least the upstream media stream incoming from the third participating endpoint to generate a downstream media stream for the third participating endpoint, in response to determining that the third participating endpoint is a participating endpoint whose endpoint identifier belongs to the replication inhibition set, removing from the global mix the intermediate mix to generate a downstream media stream for the third participating endpoint.

In an embodiment, the method further comprises: selecting received upstream media streams incoming from each participating endpoint whose power level is below a threshold to generate a second selection of upstream media streams, and to further generate the intermediate and global mixes by excluding the second selection of upstream media streams.

In an embodiment, the method further comprises:

receiving a plurality of upstream media streams encoded in Real-Time-Protocol packets from the plurality of participating endpoints, converting each received upstream media stream in order to generate a respective numerical packet in a same linear format, temporarily storing the respective numerical packets in association with the endpoint identifier of the respective participating endpoint from which the received upstream media stream originates, linearly summing the numerical packets associated with endpoint identifiers belonging to the replication inhibition set in order to generate the intermediate mix, temporarily storing the intermediate mix, linearly summing the other numerical packets with the intermediate mix in order to generate the global mix.

In an embodiment, the method further comprises:

temporarily storing the global mix, in response to determining that a third participating endpoint is a participating endpoint whose endpoint identifier does not belong to the replication inhibition set, subtracting from the global mix the numerical packet associated to the endpoint identifier of the third participating endpoint in order to generate the downstream media stream for the third participating endpoint, in response to determining that a third participating endpoint is a participating endpoint whose endpoint identifier belongs to the replication inhibition set, subtract from the global mix the intermediate mix in order to generate the downstream media stream for the third participating endpoint, send the generated downstream media stream to the third participating endpoint.

In an embodiment, a replication inhibition set is associated to each communication endpoint whose endpoint identifier belongs to the replication inhibition set.

In an embodiment, the invention also provides a method for establishing a replication inhibition set among a set of communication endpoints, the method comprising:

receiving a first presence message from a first communication endpoint, wherein the first presence message comprises a first endpoint identifier which identifies the first communication endpoint, receiving a second presence message from a second communication endpoint, wherein the second presence message comprises a second endpoint identifier which identifies the second communication endpoint, storing the first endpoint identifier and the second endpoint identifier into a replication inhibition set into the data repository in response to determining that the first communication endpoint and the second communication endpoint are located in a mutual vision area or a mutual hearing area.

BRIEF DESCRIPTION OF THE DRAWINGS

These and other aspects of the invention will be apparent from and elucidated with reference to the embodiments described hereinafter, by way of example, with reference to the drawings.

DETAILED DESCRIPTION OF THE EMBODIMENTS

Figure 1:
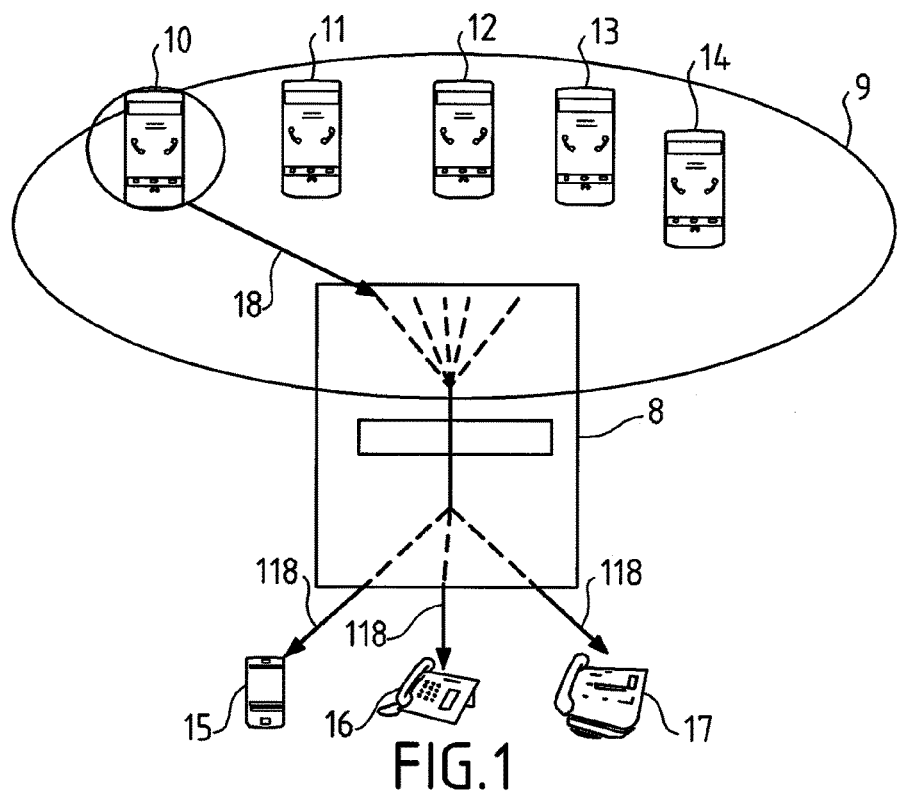
FIG. 1 schematically illustrates media streams transmitted to user devices located in different geographical sites and conferencing through a multipoint communication server, wherein an emitting user device belongs to the same geographical site as other user devices.

During a telephone conference, all the participants to the conference and their respective user devices are not necessarily located in different geographical sites. When several participants are located in a same geographical site, defined as a mutual hearing area, i.e. are located at earshot distance from one another, a first participant located near a second participant hears the second participant both directly and through the phone conference. Indeed, the first participant hears directly the second participant speaking because of the proximity. Moreover, when not avoided, the first participant also hears the second participant indirectly through the user device of the first participant.

Similarly, when several participants are located in a same geographical site defined as a mutual vision area, i.e. when the participants are able to see each other without moving, a first participant located near a second participant sees the second participant both directly and through a personal display screen, which can cause distraction for the first participant. For example, two colleagues participating to a same videoconference can sit around a table and have each a personal laptop.

Similarly, two colleagues participating to a same videoconference can sit beside each other and the first colleague can share a document displayed on his personal laptop through the videoconference with a third participant located in a different geographical site. In this case, the document is uselessly duplicated on the laptop of the second colleague, which can both see the document on the laptop of the first colleague and on his personal laptop, which can distract him. A conferencing endpoint is a user's device from which media streams are started and terminated during a conference. Each user device at each conferencing endpoint includes a microphone and/or a capture device, for instance a camera, to capture an individual media stream from the user in his/her environment. For example, a conferencing endpoint may comprise a PC, a laptop, a tablet, a deskphone, a mobile phone, a smartphone, a conference specialized hardware, and/or any other device having a microphone and/or a capture device and/or a display device and/or a loudspeaker. All the captured individual media streams should be processed to generate one or more media stream, e.g. videoconference scenes and/or voice stream, which in turn must be sent to all other conferencing endpoints participating to the conference.

The invention provides a multipoint communication server configured to avoid undesirable echoes between participants located in a mutual hearing area or undesirable image redundancy between participants located in a mutual vision area. The multipoint communication server does not replicate the upstream media stream incoming from the second participant in order to avoid the first participant experimenting an echo and/or a useless redundant sight of the second participant. The invention will now be illustrated by an embodiment relating to audio conferencing.

Figure 2:
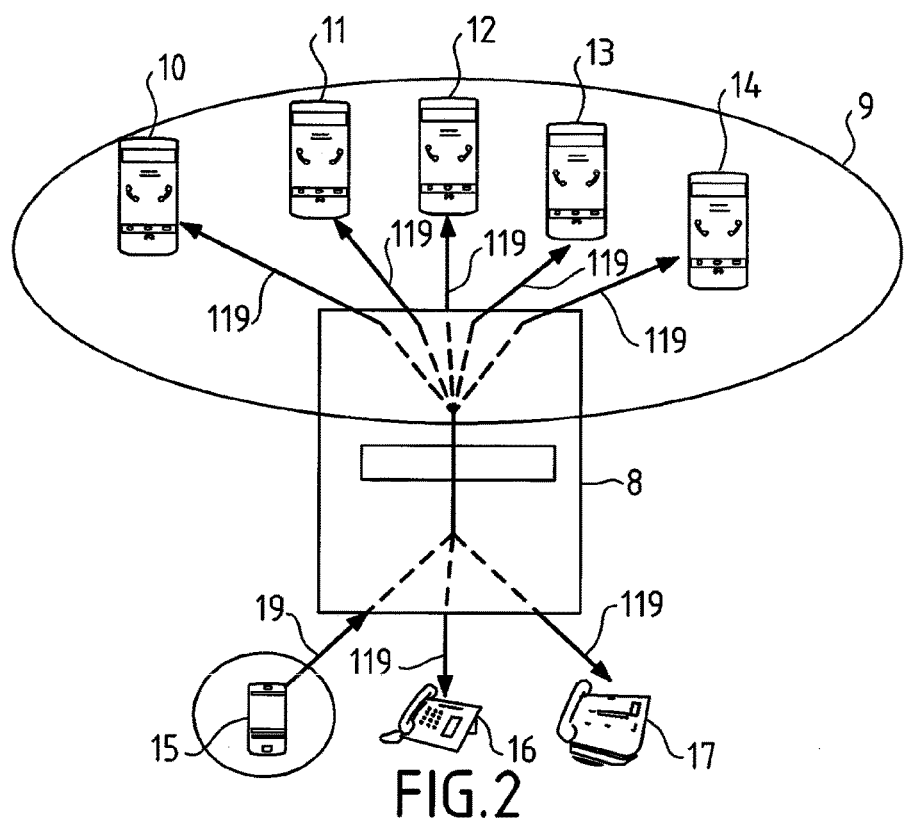
FIG. 2 schematically illustrates media streams transmitted to the user devices of FIG. 1, wherein the emitting user device does not belong to the same geographical site as the other user devices.

For example, FIGS. 1 and 2 represent a multipoint audio conference between a plurality of conferencing endpoints 10-17 distributed in four sites connected via internet through a multipoint communication server 8. The conferencing endpoints 10-14 are smartphones located in a first site 9 in a same room, e.g. a meeting room in an office, and are within earshot from each other. The conferencing endpoint 15 is a mobile phone located in a second site, the conferencing endpoints 16 and 17 are deskphones which are located in a third site and a fourth site.

FIG. 1 illustrates that the conferencing endpoint 10 is emitting an upstream voice stream 18 to the multipoint communication server 8. The multipoint communication server 8 replicates the upstream media stream 18 in order to generate downstream media streams 118 for the conferencing endpoints 15, 16 and 17 which are not located in the first site 9. The multipoint communication server 8 does not replicate the upstream media stream 18 for the conferencing endpoints 11-14 which are located in the same first site 9 as the emitting conferencing endpoint 10.

Elements which are identical or similar will be designated by the same reference numerals throughout the drawings. FIG. 2 illustrates that the conferencing endpoint 15 is emitting an upstream voice stream 19 to the multipoint communication server 8. The multipoint communication server 8 replicates the upstream media stream 19 in order to generate downstream media streams 119 for the conferencing endpoints 10, 11, 12, 13, 14, 16 and 17 which are not located in the second site as the conferencing device 15.

FIGS. 1 and 2 illustrates that an upstream voice stream emitted by a conferencing endpoint is not replicated by the multipoint communication server 8 for generating downstream voice streams intended to conferencing endpoints located in the site in which the emitting conferencing endpoint is located. Therefore, the users of the conferencing endpoints which are near the emitting conferencing endpoint do not hear any echo of the upstream voice stream.

Figure 3:
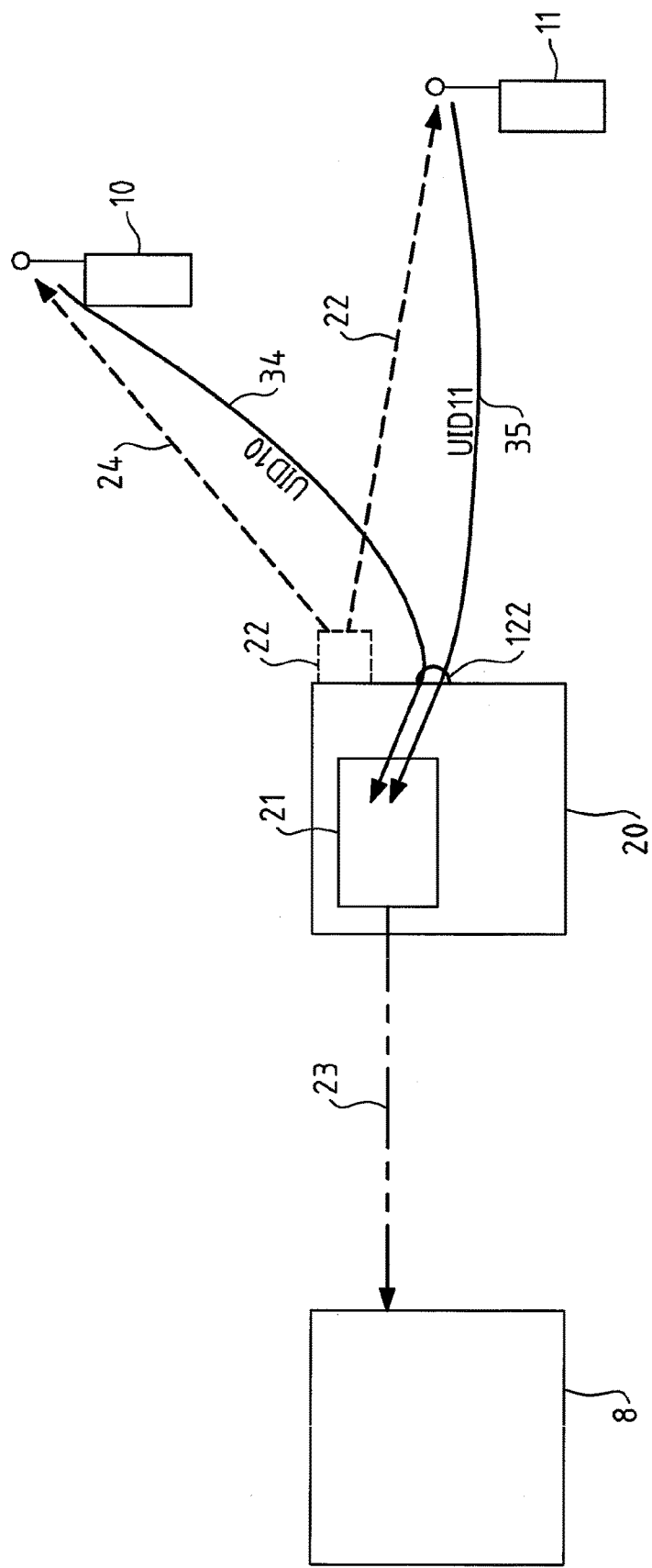
FIG. 3 schematically illustrates a localization system for establishing a list of user devices belonging to the same geographical site.

FIG. 3 illustrates an embodiment of a localization system 20 for establishing a list of user devices belonging to a same geographical site. The localization system 20 enables to establish a list of the conferencing endpoints 10 to 14 and to transmit the list to the multipoint communication server 8. For the sake of illustration, the only conferencing endpoints which are represented are the conferencing endpoints 10 and 11. The localization system comprises a beacon 22 and a processing unit 21. The beacon 22 broadcast a request 24 for presence report. The conferencing endpoints 10, 11 which are within the reach of the request 24 send a respective presence message 34, 35 comprising the respective unique endpoint identifiers UID10 and UID11 back to the localization system 20. The localization system 20 also comprises a receiver 122 for receiving the presence messages. The processing unit 21 processes the unique endpoint identifiers UID10 and UID11 to generate a list comprising both. Then, the localization system 20 sends a message 23 comprising the list to the multipoint communication server 8.

In such an embodiment, the reach of the request 24 sent by the beacon 22 defines the first site 9.

In an embodiment, the list is periodically updated in order to determine if a conferencing endpoint is leaving the first site 9 while keeping conferencing.

Therefore the list comprises the endpoint identifiers of the conferencing endpoints which are located in the first site 9, which is in this example defined as the reach of the request 24. The list may further comprise endpoint identifiers of user devices which are not participating to the conference but which are also located in the first site 9.

The localization system 20 may be implemented in various manners. For example, the localization system 20 broadcasts the request 24 and receives the presence messages 34, 35. For example, the localization system 20 uses eBeacon technology, i.e. low power Bluetooth signals for broadcasting the request 24. In an embodiment, the conferencing endpoint 10 receives an identifier of the beacon 22 and returns the presence message 34 comprising both the UID10 and the identifier of the beacon 22. In such an embodiment, the localization system 20 receiving a plurality of presence messages from a plurality of conferencing endpoints generates a list of the UIDs associated to a same beacon identifier.

In other embodiments, the beacon 22 is optional and no request 24 is sent. In such an embodiment, the conferencing endpoints 10, 11 sent a respective presence message 34, 35 comprising both the UIDs 10, 11 and the respective position of the conferencing endpoints 10, 11. The other functions of the localization system 20 already described are unchanged.

A conferencing endpoint may be aware of its position thanks to Wi-Fi or GPS signals. For example, a conferencing endpoint may support an application for establishing a mapping of the near environment and then determine the position of each conferencing endpoint inside the environment by measures of level of power of emitted Wi-Fi signals.

In such an example, the processing unit 21 receives endpoint identifiers associated to positions, for example coordinates. The processing unit is configured to calculate a distance between two positions and, in response to determining that the distance is lower than a threshold, for example 2m, to generate a list comprising the endpoint identifiers associated to the positions.

The multipoint communication server 8 is configured to receive the list comprising the unique endpoints identifiers in order to avoid replicating an upstream voice stream received from an emitting endpoint in generated downstream voice streams for conferencing endpoints whose endpoint identifiers belong to the list, namely for conferencing endpoints located in a same site as the emitting endpoint.

Figure 4:
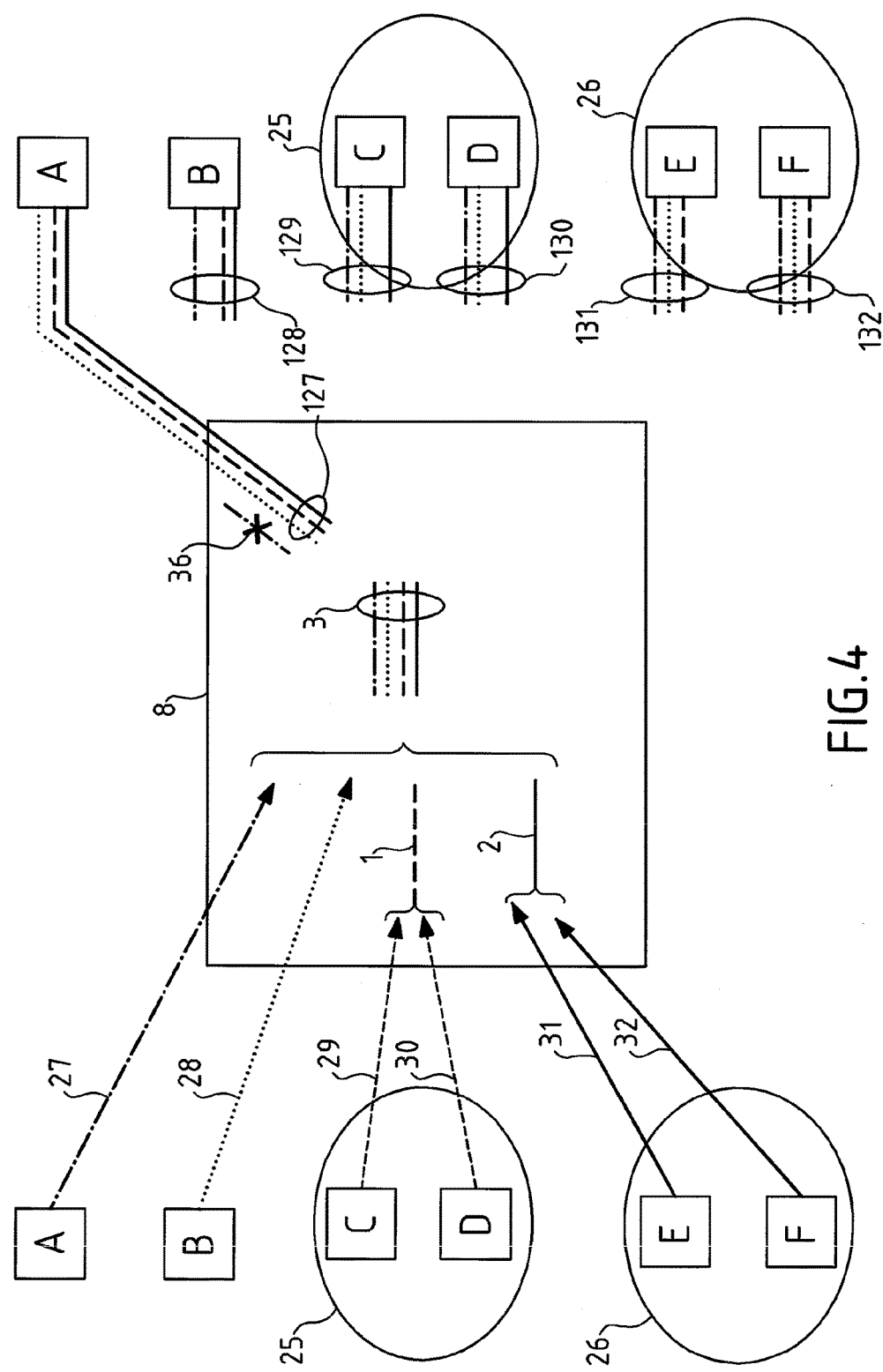
FIG. 4 schematically illustrates emitted and transmitted media streams during a conference between user devices belonging to four different geographical sites through the multipoint communication server of FIGS. 1 and 2.

With reference to FIG. 4, an example of an implementation of a multipoint communication server 8 according to the invention will now be described. The multipoint communication server 8 enables to establish a conference between six conferencing endpoints A, B, C, D, E and F represented both at the left and at the right of the multipoint communication server 8 for the sake of clarity. The conferencing endpoints are represented at the left of the multipoint communication server 8 for representing the upstream media streams and the conferencing endpoints are represented at the right of the multipoint communication server 8 for representing the downstream media streams. The locations of the conferencing endpoints A and B are not determined in the multipoint communication server 8, whereas the multipoint communication server 8 identifies that the conferencing endpoints C and D are located in an area 25 and the conferencing endpoints E and F are located in an area 26 which is in another location than the area 25. For example, the area 25 is defined as the mutual earshot of two users respectively equipped with the conferencing endpoints C and D.

The conferencing endpoint A sends an upstream voice stream 27 to the multipoint communication server 8, which is represented by the dotted-dashed line arrow. The conferencing endpoint B sends an upstream voice stream 28 to the multipoint communication server 8, which is represented by the dotted line arrow. The conferencing endpoint C sends an upstream voice stream 29 to the multipoint communication server 8 and the conferencing endpoint D sends an upstream voice stream 30 to the multipoint communication server 8, which is represented by the dashed line arrows. The conferencing endpoint E sends an upstream voice stream 31 to the multipoint communication server 8 and the conferencing endpoint F sends an upstream voice stream 32 to the multipoint communication server 8, which is represented by the solid line arrows.

The multipoint communication server 8 is configured to determine that the endpoint identifiers of the conferencing endpoints C and D belong to a first list associated to the area 25, and that the endpoint identifiers of the conferencing endpoints E and F belong to a second list associated to the area 26. Namely, the multipoint communication server 8 determines that the conferencing endpoints C and D are located in the area 25 and the conferencing endpoints E and F are located in the area 26.

The multipoint communication server 8 is configured to generate intermediary mixes by mixing together upstream voice streams incoming from conferencing endpoints which are located in the same area. Therefore, the multipoint communication server 8 mixes together the upstream voice streams 29 and 30 to generate an intermediary mix 1 and the upstream voice streams 31 and 32 to generate an intermediary mix 2. Then, the multipoint communication server 8 is configured to generate a global mix 3 by mixing together the intermediary mixes 1 and 2 and the upstream voice streams 27 and 28. The global mix 3 comprises all the emitted upstream voice streams 27, 28, 29, 30, 31 and 32 mixed together.

The multipoint communication server 8 comprises or accesses a data repository in which is stored the following replication inhibition lists:

| Number of the replication inhibition list | List of endpoint identifiers | For each conferencing endpoint whose endpoint identifier belongs to the replication inhibition list, the multipoint communication server 8 is configured to: |
|---|---|---|
| Replication inhibition list 1 | {A} | Inhibit the replication of the voice stream 27 emitted by the conferencing endpoint A. |
| Replication inhibition list 2 | {B} | Inhibit the replication of the voice stream 28 emitted by the conferencing endpoint B. |
| Replication inhibition list 3 | {C, D} | Inhibit the replication of the intermediate mix 1 |
| Replication inhibition list 4 | {E, F} | Inhibit the replication of the intermediate mix 2 |

For the sake of clarity, the downstream voice stream for a conferencing endpoint is numbered with the same numeral as the upstream voice stream incoming from the conferencing endpoint augmented by 100. The multipoint communication server 8 is configured to generate a respective downstream voice stream for each conferencing endpoint by:

determining if the endpoint identifier of the conferencing endpoint belongs to a list, if the endpoint identifier of the conferencing endpoint does not belong to a list, removing from the global mix 3 the upstream voice stream incoming from the conferencing endpoint, and if the endpoint identifier of the conferencing endpoint belongs to a list removing from the global mix 3 the intermediary mix comprising the mixed upstream voice streams incoming from an area in which the conferencing endpoint is located.

For example, as illustrated on FIG. 4, the downstream voice stream 127 generated for the conferencing endpoint A is generated by removing the upstream voice stream 27 which is incoming from the conferencing endpoint A from the global mix 3, as represented by the cross 36. Similarly, the downstream voice stream 128 generated for the conferencing endpoint B is generated by removing the upstream voice stream 28 which is incoming from the conferencing endpoint B from the global mix 3. Similarly, the downstream voice stream 129 generated for the conferencing endpoint C is generated by removing from the global mix 3 the intermediary mix 1 whose mixed upstream voice streams 29 and 30 are incoming from the conferencing endpoints C and D of the area 25. Therefore, the downstream voice stream 129 and the downstream voice stream 130 are identical and are generated by simply removing the intermediary mix 1 from the global mix 3, then by duplication. Similarly, the downstream voice stream 131 and the downstream voice stream 132 are identical and are generated by simply removing the intermediary mix 2 from the global mix 3, then by duplication.

This implementation is particularly advantageous because the processing cost and time are reduced by removing only one intermediary mix instead of removing two independent upstream voice streams from the global mix.

Figure 8:
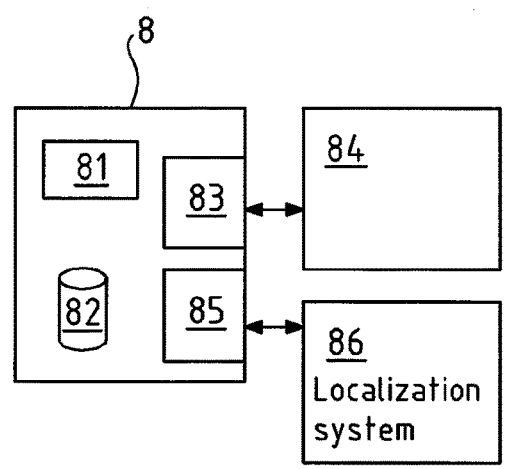
FIG. 8 schematically illustrates a multipoint communication server according to an embodiment.

There are various implementations of the multipoint communication server 8. In an embodiment described with reference to FIG. 8, the multipoint communication server 8 comprises a data repository 82, a media processing unit 81, and a control session interface 83. The control session interface 83 communicates, as represented by arrows, with a session control unit 84. The session control unit 84 manages the signalization for establishing call sessions between the participants of the conference. The media processing unit 81 is driven by the control session interface 83 which is called by the session control unit 84. The multipoint communication server 8 further comprises a localization system interface 85 which communicates with a localization system 86, as represented by arrows.

In an alternative embodiment (not represented), the multipoint communication server 8 may comprise the session control unit 84 for controlling the multipoint communication session.

In an alternative embodiment (not represented), the multipoint communication server 8 may comprise the localization system.

In an embodiment, the participants of a call conference send directly their localization to the multipoint communication server 8. In such an embodiment, the communication endpoints are configured to send a message comprising their location to the multipoint communication system 8, based on Dual-tone multi-frequency signaling (DTMF). In such an embodiment, the session control unit 84 is configured to play the role of the localization system 86.

In an embodiment, the multipoint communication server 8 may comprise an application server and a media server. The application server is configured to manage signalization streams for controlling a multipoint communication session between the conferencing endpoints and establishing audio or video calls. Signalizations streams may be based on various protocols. For example, the formats of the signalization streams are according to the SIP protocol, or Q.931, etc. A conferencing endpoint initiates an audio or video conference by sending a request for establishing call, for example using SIP protocol, to the application server. The multipoint communication server 8 comprises a media server configured to process video streams, i.e. to perform video conferencing tasks as video mixing, video switching, trans-coding, trans-scaling or other manipulations on video streams. During a videoconference, bidirectional communication channel is established between a media server and conferencing endpoints. Such a communication channel is able to carry a video stream in both directions. In use, the communication channel carries the captured individual audio and/or video stream from the conferencing endpoints to a media server in one direction and the generated audio and/or video conference stream from a media server to the conferencing endpoints in the other direction. According to an embodiment of the invention, the generated audio and/or video conference stream for a conferencing endpoint does not replicate upstream audio and/or video streams incoming from any conferencing endpoint belonging to the same area than the conferencing endpoint.

The media server is configured to manage, namely mix, audio and/or video streams using for example Real-Time-Protocol RTP.

The application server invokes an application programming interface API. Then, the media server request the API for allocating or deallocating audio and/or video resources to an audio and/or video call: IP address, RTP or RTCP ports, etc. The API will create a conferencing routing map for the audio and/or video streams. The API will manage the connection or disconnection of a call to the conference, mute an upstream or a downstream media stream of a call and define the source area of a call.

The media server also comprises buffers and transcoding modules in a known manner.

In an embodiment, the media server processes audio mixing by simply adding RTP packets received from each participant. At a time t, the media server receives from each participant i a RTP packet which is encoded. The RTP packet is numerical. The media server decodes each packet in a same linear format, for example by Pulse Code Modulation PCM. Therefore, all the packets are same-length vectors whose coefficients represents each both a sound and a level of power during a fixed duration.

For example, a packet of an time t of a participant i is written as follows: packet$_{t_i}$=[coefficient$_i$. 1, ... , coefficient$_i$. n], wherein n represents the length of the vector.

The media server calculates a vectorial sum of all the packets received from the participants at the time t in order to generate a mixed packet:

$$\text{mixed packet} = \sum_i \text{packet}_{t_i} = \left[\sum_i \text{coefficient}_i \cdot 1, \ldots , \sum_i \text{coefficient}_i \cdot n\right]$$

For each participant i, the media server generates a re-encoded linear RTP packet downstream packet packet$_{t_i}$ by subtracting from mixed packet all the packets packet$_{t_j}$ from participants j belonging to a same replication inhibition set as the participant I, including the case where j=i.

For example, a participant i does not belong to any replication inhibition set. The only packet to subtract from the global mix is the packet$_{t_i}$ emitted by the participant i:

downstream packet$_i$=Σ$_k$ packet$_{t_k}$−packet$_{t_i}$=[Σ$_k$ coefficient$_k$. 1−coefficient$_i$. 1, ... ,Σ$_k$ coefficient$_k$. n−coefficient$_i$. n]

For example, a participant i belongs to a replication inhibition set. The packets to subtract from the global mix are the packet$_{t_i}$ emitted by the participant i and the packets emitted by the participants belonging to the same replication inhibition set. For example, only another participant w belongs to the replication inhibition set. A second packet to subtract is the packet packet$_{t_w}$:

$$\text{downstream packet}_i = \sum_k \text{packet}_{t_k} - \text{packet}_{t_i} - \text{packet}_{t_w} =$$
$$\left[\sum_k \text{coefficient}_k \cdot 1 - \text{coefficient}_i \cdot 1 - \text{coefficient}_w \cdot 1, \ldots, \sum_k \text{coefficient}_k \cdot n - \text{coefficient}_i \cdot n - \text{coefficient}_w \cdot n\right]$$

Moreover, the mix may only sum packets whose level of power is above a threshold and/or higher than the mean of level of power of the packets.

Figure 7:
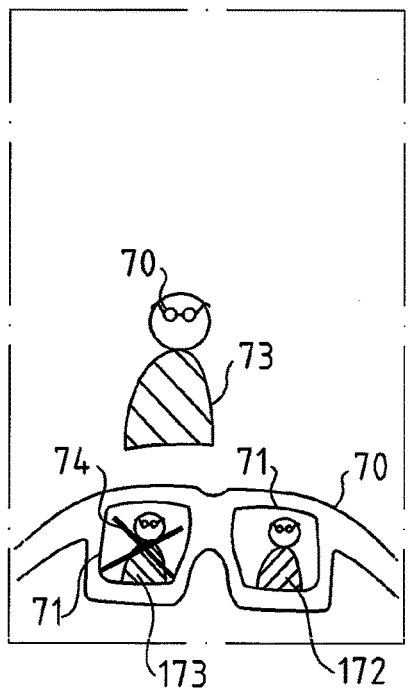
FIG. 7 schematically illustrates a video conference according to an embodiment.

Now, with reference to FIG. 7, the invention will now be illustrated by an embodiment relating to video conferencing. A multipoint communication server according to such an embodiment allows avoiding undesirable image redundancy between participants located in a mutual vision area. The participants use display screens, for example the display screens of their laptops. In the pictured example, the display screens 71 are special glasses configured to display a video stream on a transparent glass in order to superimpose the video stream on the direct vision for the eyes of a user, e.g. google Glasses®. As pictured, a first participant wears these special glasses 70, a second participant (not represented) also wears special glasses 70 and a third participant 73 as well. The first participant and the third participant 73 are in a mutual vision area, whereas the second participant is located in another place which is not in the vision area of the first participant and third participant 73. A multipoint communication server according to the invention, not represented, suppress the picture 173 of the third participant 73 in the video stream intended to the first participant, as shown by the cross 74, while keeping the picture 172 of the second participant. Indeed, the multipoint communication server comprises a data repository in which is stored a replication inhibition list comprising identifiers of the special glasses of the first participant and third participant 73. Therefore, the multipoint communication server allows avoiding undesirable image redundancy of the third participant for the first participant. Although the example pictured is very simple, any number of participants may participate to the video conferencing. The multipoint communication server is configured to inhibit the replication of the video streams thanks to replication inhibition lists as described in the audio embodiments.

Figure 6:
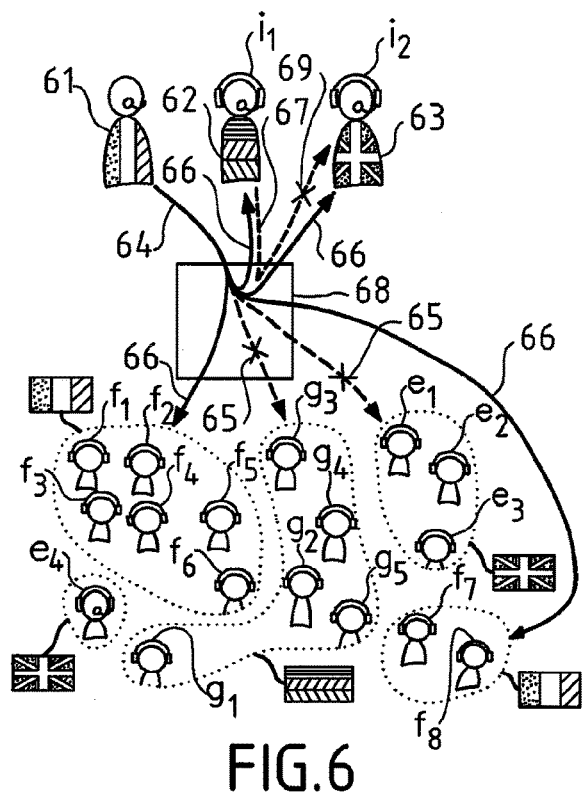
FIG. 6 schematically illustrates a multilingual conference according to an embodiment.

Now with reference to FIG. 6, the invention will now be illustrated by an embodiment relating to a multilingual conference with a lecturer 61 equipped with a microphone and two interpreters 62 and 63, each equipped with a headphone and a microphone. A multipoint communication server 68 according to such an embodiment allows avoiding undesirable voice echo in another language than the chosen one for the participants in order to improve the concentration. For example, the lecturer 61 speaks in French language in his microphone. The first interpreter 62 hears the French lecture in his headphone and translates the lecture in German language in real-time through his microphone. The second interpreter 63 hears the French lecture in his headphone and translates the lecture in English language in real-time through his microphone. A plurality of participants to the conference are listening each the lecture thanks to headphones. The microphones and headphones are all connected through the multipoint communication server 68. Each participant chooses the language between French, German and English on his headphone, and the headphones are identified in a data repository of the multipoint communication server 68 by headphones identifiers. For example, the headphone of the first interpreter 62 is identified by a headphone identifier i1, and the headphone of the second interpreter 63 is identified by an headphone identifier i2. The data repository comprises the headphones identifiers in association with the chosen language. For the sake of clarity, a headphone identifier which is associated to the French language is identified by the letter f followed by a number. A headphone identifier which is associated to the English language is identified by the letter e followed by a number. A headphone identifier which is associated to the German language is identified by the letter g followed by a number.

The headphones identifiers are stored in the data repository in replication inhibition sets as a function of the associated chosen language as described in the following table:

| Number of the replication inhibition set | For each headphone whose headphone identifier belongs to the replication inhibition set, the multipoint communication server 68 is configured to: | Set of headphones identifiers comprised in the replication inhibition set: |
|---|---|---|
| Replication | Inhibit the replication of the voice | {e1, e2, e3, e4, g1, |

| Number of the replication inhibition set | For each headphone whose headphone identifier belongs to the replication inhibition set, the multipoint communication server 68 is configured to: | Set of headphones identifiers comprised in the replication inhibition set: |
|---|---|---|
| inhibition set 1 | stream emitted by the lecturer 61 in French language | g2, g3, g4, g5} |
| Replication inhibition set 2 | Inhibit the replication of the voice stream emitted by the interpreter 62 in German language | {i2, f1, f2, f3, f4, f5, f6, f7, f8, e1, e2, e3, e4} |
| Replication inhibition set 3 | Inhibit the replication of the voice stream emitted by the interpreter 62 in English language | {i1, f1, f2, f3, f4, f5, f6, f7, f8, g1, g2, g3, g4, g5} |

For example, a French voice stream 64 is represented which is emitted from the lecturer 61 to the multipoint communication server 68. The multipoint communication server 68 is configured to replicate the French voice stream 64 for each headphone whose headphone identifiers does not belong to the replication inhibition set 1, as described by the arrows 66. The multipoint communication server 68 is configured to inhibit the replication of the French voice stream 64 for each headphone whose headphone identifiers belongs to the replication inhibition set 1, as described by the crosses 65. For example, the first interpreter 62 receiving the replicated French voice stream 66 transmits to the multipoint communication server 68 a German voice stream 67 which is a real-time translation of the French voice stream 66. The headphone which is identified by the headphone identifier i2 belonging to the replication inhibition set 2, the multipoint communication server 68 is configured to inhibit the replication of the German voice stream 67, as described by the cross 69. Hence, the second interpreter 63 is not disturbed by hearing both the French voice stream 66 and the German voice stream 67.

Thanks to these features, the same frequency bandwidth is used for all the languages, with enables to save bandwidth.

Figure 5:
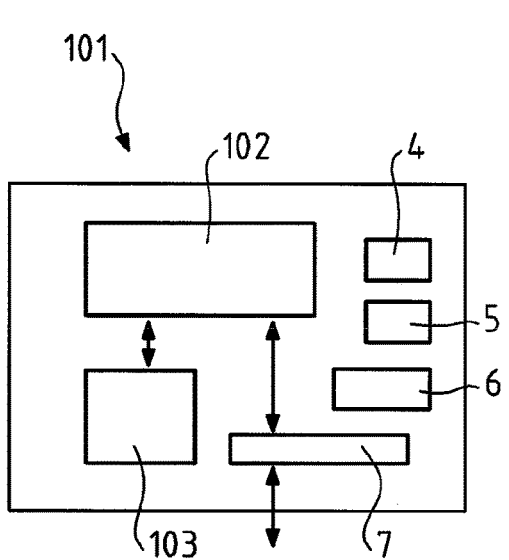
FIG. 5 schematically illustrates a computing device which can be used for implementing any of the following: communication endpoints, localization system, multipoint communication server.

FIG. 5 illustrates a computing device 1 which can be used for implementing any of the following: endpoints, localization system, multipoint communication server, the computing device 1 comprising a data repository 2 connected to a processing unit 3 and to a communication interface 7. The computing device 1 also comprises an input device 1, an output device 5 and an analog-to-digital and/or digital-to-analog converter 7.

The invention is not limited to the described embodiments. The appended claims are to be construed as embodying all modification and alternative constructions that may be occurred to one skilled in the art, which fairly fall within the basic teaching here, set forth. The use of the verb "to comprise" or "to include" and its conjugations does not exclude the presence of elements or steps other than those stated in a claim. Furthermore, the use of the article "a" or an preceding an element or step does not exclude the presence of a plurality of such elements or steps. The invention may be implemented by means of hardware as well as software. The same item of hardware may represent several "means".

The endpoints, localization system, multipoint communication server, database described hereinabove may be implemented through the use of dedicated hardware as well as hardware capable of executing software in association with appropriate software. When provided by a processor, the corresponding functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, central processing unit (CPU), digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included. The endpoints, call control server, processing devices, DVP system, node registry, task manager and database described hereinabove may be implemented in a unitary manner or in a distributed manner.

In the claims, any reference signs placed between parentheses shall not be construed as limiting the scope of the claims.

The invention claimed is:

1. A multipoint communication server for establishing multipoint communication between a plurality of endpoints, the multipoint communication server comprising:
   a session control interface configured to receive a set of endpoint identifiers, wherein each endpoint identifier identifies a participating endpoint which participates to a multipoint communication session,
   a data repository containing the set of endpoints identifiers,
   a media processing unit configured to receive a first upstream media stream from a first emitting endpoint among the participating endpoints of the multipoint communication session, the media processing unit being further configured to generate a plurality of downstream media streams for the participating endpoints of the multipoint communication session,
   wherein the data repository further contains a first replication inhibition set associated to the first emitting endpoint, wherein the first replication inhibition set consists of a subset of the set of endpoint identifiers of the participating endpoints, wherein the first replication inhibition set comprises at least an endpoint identifier of the first emitting endpoint,
   wherein the media processing unit is configured to generate the downstream media stream for each participating endpoint whose endpoint identifier belongs to the first replication inhibition set so that the downstream media stream does not replicate the first upstream media stream,
   wherein the media processing unit is configured to generate the downstream media stream for each participating endpoint whose endpoint identifier does not belong to the first replication inhibition set, so that the downstream media stream does replicate the first upstream media stream,
   wherein the media processing unit is further configured to:
      receive a second upstream media stream from a second emitting endpoint among the participating endpoints of the multipoint communication session, wherein the data repository further contains a second replication inhibition set associated to the second emitting endpoint, wherein the second replication inhibition set consists of a subset of the set of endpoint identifiers of the participating endpoints, wherein the second replication inhibition set comprises at least an endpoint identifier of the second emitting endpoint,
      in response to determining that an endpoint identifier of a third participating endpoint belongs neither to the first replication inhibition set nor to the second replication inhibition set, mixing together the first and second upstream media streams incoming from the first and second emitting endpoints in order to generate the downstream media stream for the third participating endpoint, in response to determining that the endpoint identifier of the third participating endpoint belongs to the first replication inhibition set and not to the second replication inhibition set, generate the downstream media stream for the third participating endpoint to replicate the second upstream media stream without replicating the first upstream media stream, and in response to determining that the endpoint identifier of the third participating endpoint belongs to the second replication inhibition set and not to the first replication inhibition set, generate the downstream media stream for the third participating endpoint to replicate the first upstream media stream without replicating the second upstream media stream.

2. The multipoint communication server according to claim 1, wherein the media processing unit is further configured to:

receive a plurality of upstream media streams from the participating endpoints of the multipoint communication session, select among the plurality of received upstream media streams each received upstream media stream incoming from the participating endpoint whose endpoint identifier belongs to the first replication inhibition set in order to generate a selection of upstream media streams, generate an intermediate mix by mixing the selection of upstream media streams, generate a global mix by mixing the intermediate mix with all other received upstream media streams among the plurality of received upstream media streams, in response to determining that the endpoint identifier of the third participating endpoint does not belong to the first replication inhibition set, removing from the global mix at least the upstream media stream incoming from the third participating endpoint to generate a downstream media stream for the third participating endpoint, in response to determining that the endpoint identifier of the third participating endpoint belongs to the first replication inhibition set, removing from the global mix the intermediate mix to generate a downstream media stream for the third participating endpoint.

3. The multipoint communication server according to claim 2, wherein the media processing unit is configured to further select received upstream media streams incoming from each participating endpoint whose power level is below a threshold to generate a second selection of upstream media streams, and to further generate the intermediate and global mixes by excluding the second selection of upstream media streams.

4. The multipoint communication server according to claim 2, wherein the media processing unit is further configured to:

receive a plurality of upstream media streams encoded in Real-Time-Protocol packets from the plurality of participating endpoints, convert each received upstream media stream in order to generate a respective numerical packet in a same linear format, temporarily store the respective numerical packets in association with the endpoint identifier of the respective participating endpoint from which the received upstream media stream originates, linearly sum the numerical packets associated with endpoint identifiers belonging to the replication inhibition set in order to generate the intermediate mix, temporarily store the intermediate mix, linearly sum the other numerical packets with the intermediate mix in order to generate the global mix.

5. The multipoint communication server according to claim 4, wherein the media processing unit is further configured to:

temporarily store the global mix, in response to determining that the endpoint identifier of the third participating endpoint does not belong to the first replication inhibition set, subtract from the global mix the numerical packet associated to the endpoint identifier of the third participating endpoint in order to generate the downstream media stream for the third participating endpoint, in response to determining that the endpoint identifier of the third participating endpoint belongs to the first replication inhibition set, subtract from the global mix the intermediate mix in order to generate the downstream media stream for the third participating endpoint, send the generated downstream media stream to the third participating endpoint.

6. The multipoint communication server according to claim 1, wherein a replication inhibition set is associated to each communication endpoint whose endpoint identifier belongs to the first replication inhibition set.

7. A conferencing system comprising a multipoint communication server for establishing multipoint communication between a plurality of endpoints, the multipoint communication server comprising:

a session control interface configured to receive a set of endpoint identifiers, wherein each endpoint identifier identifies a participating endpoint which participates to a multipoint communication session, a data repository containing the set of endpoints identifiers, a media processing unit configured to receive a first upstream media stream from a first emitting endpoint among the participating endpoints of the multipoint communication session, the media processing unit being further configured to generate a plurality of downstream media streams for the participating endpoints of the multipoint communication session, wherein the data repository further contains a first replication inhibition set associated to the first emitting endpoint, wherein the first replication inhibition set consists of a subset of the set of endpoint identifiers of the participating endpoints, wherein the first replication inhibition set comprises at least an endpoint identifier of the first emitting endpoint, wherein the media processing unit is configured to generate the downstream media stream for each participating endpoint whose endpoint identifier belongs to the first replication inhibition set so that the downstream media stream does not replicate the first upstream media stream, wherein the media processing unit is configured to generate the downstream media stream for each participating endpoint whose endpoint identifier does not belong to the first replication inhibition set, so that the downstream media stream does replicate the first upstream media stream,
wherein the media processing unit is further configured to:
  receive a second upstream media stream from a second emitting endpoint among the participating endpoints of the multipoint communication session, wherein the data repository further contains a second replication inhibition set associated to the second emitting endpoint, wherein the second replication inhibition set consists of a subset of the set of endpoint identifiers of the participating endpoints, wherein the second replication inhibition set comprises at least an endpoint identifier of the second emitting endpoint,
  in response to determining that an endpoint identifier of a third participating endpoint belongs neither to the first replication inhibition set nor to the second replication inhibition set, mixing together the first and second upstream media streams incoming from the first and second emitting endpoints in order to generate the downstream media stream for the third participating endpoint,
  in response to determining that the endpoint identifier of the third participating endpoint belongs to the first replication inhibition set and not to the second replication inhibition set, generate the downstream media stream for the third participating endpoint to replicate the second upstream media stream without replicating the first upstream media stream, and
  in response to determining that the endpoint identifier of the third participating endpoint belongs to the second replication inhibition set and not to the first replication inhibition set, generate the downstream media stream for the third participating endpoint to replicate the first upstream media stream without replicating the second upstream media stream.

8. The conferencing system according to claim 7, wherein the media processing unit is further configured to:
  receive a plurality of upstream media streams from the participating endpoints of the multipoint communication session,
  select among the plurality of received upstream media streams each received upstream media stream incoming from the participating endpoint whose endpoint identifier belongs to the first replication inhibition set in order to generate a selection of upstream media streams,
  generate an intermediate mix by mixing the selection of upstream media streams,
  generate a global mix by mixing the intermediate mix with all other received upstream media streams among the plurality of received upstream media streams,
  in response to determining that the endpoint identifier of the third participating endpoint does not belong to the first replication inhibition set, removing from the global mix at least the upstream media stream incoming from the third participating endpoint to generate a downstream media stream for the third participating endpoint,
  in response to determining that the endpoint identifier of the third participating endpoint belongs to the first replication inhibition set, removing from the global mix the intermediate mix to generate a downstream media stream for the third participating endpoint.

9. The conferencing system according to claim 8, wherein the media processing unit is configured to further select received upstream media streams incoming from each participating endpoint whose power level is below a threshold to generate a second selection of upstream media streams, and
  to further generate the intermediate and global mixes by excluding the second selection of upstream media streams.

10. The conferencing system according to claim 8, wherein the media processing unit is further configured to:
  receive a plurality of upstream media streams encoded in Real-Time-Protocol packets from the plurality of participating endpoints,
  convert each received upstream media stream in order to generate a respective numerical packet in a same linear format,
  temporarily store the respective numerical packets in association with the endpoint identifier of the respective participating endpoint from which the received upstream media stream originates,
  linearly sum the numerical packets associated with endpoint identifiers belonging to the replication inhibition set in order to generate the intermediate mix,
  temporarily store the intermediate mix,
  linearly sum the other numerical packets with the intermediate mix in order to generate the global mix.

11. The conferencing system according to claim 10, wherein the media processing unit is further configured to:
  temporarily store the global mix,
  in response to determining that the endpoint identifier of the third participating endpoint does not belong to the first replication inhibition set, subtract from the global mix the numerical packet associated to the endpoint identifier of the third participating endpoint in order to generate the downstream media stream for the third participating endpoint,
  in response to determining that the endpoint identifier of the third participating endpoint belongs to the first replication inhibition set, subtract from the global mix the intermediate mix in order to generate the downstream media stream for the third participating endpoint, and
  send the generated downstream media stream to the third participating endpoint.

12. The conferencing system according to claim 7 further comprising the participating endpoints, wherein the participating endpoints are configured to:
  transmit upstream media streams to the multipoint communication server and receive downstream media streams from the multipoint communication server,
wherein at least one participating endpoints is further configured to:
  in response to receiving the broadcasted request from a localization system, sending a presence message to the localization system.

13. A method for establishing multipoint communication between a plurality of endpoints, the method comprising:
  accessing a set of endpoint identifiers, wherein each endpoint identifier identifies a participating endpoint which participates to a multipoint communication session,
  receiving a first upstream media stream from a first emitting endpoint among the participating endpoints of the multipoint communication session, generating a plurality of downstream media streams for the participating endpoints of the multipoint communication session, wherein a first replication inhibition set associated to the first emitting endpoint consists of a subset of the set of endpoint identifiers of the participating endpoints, wherein the first replication inhibition set comprises at least an endpoint identifier of the first emitting endpoint, generating the downstream media stream for each participating endpoint whose endpoint identifier belongs to the replication inhibition set so that the downstream media stream does not replicate the first upstream media stream, generating the downstream media stream for each participating endpoint whose endpoint identifier does not belong to the first replication inhibition set, so that the downstream media stream does replicate the first upstream media stream, receiving a second upstream media stream from a second emitting endpoint among the participating endpoints of the multipoint communication session, wherein a second replication inhibition set associated to the second emitting endpoint consists of a subset of the set of endpoint identifiers of the participating endpoints, wherein the second replication inhibition set comprises at least an endpoint identifier of the second emitting endpoint, in response to determining that an endpoint identifier of a third participating endpoint belongs neither to the first replication inhibition set nor to the second replication inhibition set, mixing together the first and second upstream media streams incoming from the first and second emitting endpoints in order to generate the downstream media stream for the third participating endpoint, in response to determining that the endpoint identifier of the third participating endpoint belongs to the first replication inhibition set and not to the second replication inhibition set, generate the downstream media stream for the third participating endpoint to replicate the second upstream media stream without replicating the first upstream media stream, and in response to determining that the endpoint identifier of the third participating endpoint belongs to the second replication inhibition set and not to the first replication inhibition set, generate the downstream media stream for the third participating endpoint to replicate the first upstream media stream without replicating the second upstream media stream.

* * * * *